(12) United States Patent
Proscia et al.

(10) Patent No.: US 7,401,682 B2
(45) Date of Patent: Jul. 22, 2008

(54) ARCHITECTURE FOR AN ACOUSTIC LINER

(75) Inventors: William Proscia, Marlborough, CT (US); Christopher D. Jones, Thomaston, CT (US)

(73) Assignee: United Technologies Corporation, Hartford, CT (US)

( * ) Notice: Subject to any disclaimer, the term of this patent is extended or adjusted under 35 U.S.C. 154(b) by 231 days.

(21) Appl. No.: 11/200,563

(22) Filed: Aug. 10, 2005

(65) Prior Publication Data

US 2007/0034446 A1    Feb. 15, 2007

(51) Int. Cl.
*E04B 1/82* (2006.01)
*B64C 1/40* (2006.01)
*B64C 1/38* (2006.01)

(52) U.S. Cl. ............... 181/290; 181/292; 181/293; 181/214; 244/1 N; 244/117 A; 239/265.17; 60/766

(58) Field of Classification Search ............ 181/290, 181/292, 293, 288, 210, 214, 220; 244/1 N, 244/53 B, 117 A, 126, 204, 130, 57, 209; 415/119; 239/265.11, 265.17; 60/766, 265
See application file for complete search history.

(56) References Cited

U.S. PATENT DOCUMENTS

| | | | | |
|---|---|---|---|---|
| 3,246,469 A * | 4/1966 | Moore | ........................ | 60/265 |
| 3,819,009 A * | 6/1974 | Motsinger | ................... | 181/292 |
| 3,848,697 A * | 11/1974 | Jannot et al. | ................ | 181/220 |
| 4,071,194 A * | 1/1978 | Eckert et al. | ............. | 239/127.3 |
| 4,106,587 A | 8/1978 | Nash et al. | | |
| 4,135,603 A | 1/1979 | Dean, III et al. | | |
| 4,161,231 A * | 7/1979 | Wilkinson | ................... | 181/292 |
| 4,231,447 A * | 11/1980 | Chapman | ..................... | 181/213 |
| 4,257,998 A | 3/1981 | Diepenbrock, Jr. et al. | | |
| 4,327,816 A | 5/1982 | Bennett | | |
| 4,645,032 A * | 2/1987 | Ross et al. | ................... | 181/250 |
| 4,944,362 A * | 7/1990 | Motsinger et al. | ........... | 181/213 |
| 5,363,654 A * | 11/1994 | Lee | .............................. | 60/752 |
| 5,388,765 A * | 2/1995 | Hill et al. | .................. | 239/127.3 |
| 5,445,861 A * | 8/1995 | Newton et al. | .............. | 428/116 |
| 5,496,156 A * | 3/1996 | Harper et al. | ................ | 417/312 |
| 5,512,715 A * | 4/1996 | Takewa et al. | .............. | 181/295 |
| 5,528,904 A * | 6/1996 | Jones et al. | ................... | 60/753 |
| 5,605,046 A * | 2/1997 | Liang | .......................... | 60/752 |
| 5,655,361 A * | 8/1997 | Kishi | ........................... | 60/266 |
| 6,290,022 B1 * | 9/2001 | Wolf et al. | .................. | 181/292 |

(Continued)

FOREIGN PATENT DOCUMENTS

| | | |
|---|---|---|
| GB | 1 490 923 | 11/1977 |
| GB | 2 038 410 | 7/1980 |
| JP | 01226907 A * | 9/1989 |

*Primary Examiner*—Edgardo San Martin
(74) *Attorney, Agent, or Firm*—Carlson, Gaskey & Olds

(57) ABSTRACT

An acoustic liner 20 includes a remote panel 26, a perforated proximate panel 22 transversely spaced from the remote panel and one or more partitions 32 spanning across the space between the panels. At least one baffle 44 cooperates with the partitions to define a resonator chamber 34b and an associated neck 56 for establishing communication between the resonator chamber and a fluid stream G flowing past the proximate panel.

26 Claims, 7 Drawing Sheets

U.S. PATENT DOCUMENTS

| | | |
|---|---|---|
| 6,804,947 B2 * | 10/2004 | Le Docte et al. ........... 60/226.2 |
| 7,055,308 B2 * | 6/2006 | Pinard et al. ................. 60/247 |
| 7,089,741 B2 * | 8/2006 | Ikeda et al. .................. 60/725 |
| 2002/0070077 A1 * | 6/2002 | Porte et al. .................. 181/292 |
| 2005/0284690 A1 * | 12/2005 | Proscia et al. .............. 181/214 |
| 2007/0102235 A1 * | 5/2007 | Tobik et al. ................ 181/250 |

* cited by examiner

ARCHITECTURE FOR AN ACOUSTIC LINER

STATEMENT OF GOVERNMENT INTEREST

This invention was made under U.S. Government Contract F33657-99-D-2051. The Government has certain rights in the invention.

CROSS REFERENCE TO RELATED APPLICATIONS

This application includes subject matter in common with co-pending, concurrently filed application entitled "Acoustic Liner with Bypass Cooling", both applications being assigned to or under obligation of assignment to United Technologies Corporation.

TECHNICAL FIELD

This invention relates to noise attenuating acoustic liners and particularly to a liner having simple, cost effective features for attenuating low frequency noise and/or in which coolant bypasses the liner's acoustic resonator chambers to improve the durability of the liner without impairing its noise attenuating properties.

BACKGROUND

Acoustic liners are used in fluid handling ducts to attenuate undesirable noise associated with a stream of fluid flowing through the duct. Examples of such ducts include the inlet and exhaust system ducts of gas turbine aircraft engines. A typical acoustic liner includes a back sheet and a face sheet spaced from the back sheet to define an inter-sheet compartment. The liner is positioned along the duct wall with the face sheet extending approximately parallel to the direction of fluid flow through the duct. The inter-sheet compartment serves as a resonator chamber for attenuating noise. Walls may extend between the sheets to subdivide the compartment into multiple smaller resonator chambers. A set of holes or necks perforates the face sheet to establish communication between the chamber (or chambers) and the fluid stream. One well known relationship that describes the noise frequency that a resonator will attenuate is:

$$f = (c/2\pi)[A_N/(V_C L_N)]^{0.5}$$

where c is the local speed of sound, $A_N$ is the cross sectional area of the neck leading to a chamber (or the aggregate area of multiple necks leading to a chamber) $V_C$ is the volume of the chamber and $L_N$ is the length of the neck. In a typical turbine engine acoustic liner, the face sheet is made of sheet stock. Accordingly, $L_N$ is the thickness of the sheet.

When the acoustic liner is used in a hot environment, for example to line an afterburner duct, it may be desirable to cool the liner to extend its useful life. Cooling may be accomplished by supplying coolant, usually relatively cool air, to the resonator chambers and allowing the coolant to flow through the chambers and discharge through the resonator necks. However at the flow rates typically required for satisfactory cooling, the coolant discharging through the resonator necks degrades the liner's acoustic admittance, which is a measure of its ability to admit acoustic disturbances into the resonator chambers.

Even if cooling is not required, it may be necessary to tune a resonator chamber to attenuate low frequency noise. A resonator can be tuned to a low frequency by increasing $V_C$ or $L_N$ or by decreasing $A_N$. For aircraft engine applications, increasing $V_C$ may not be an option due to space constraints. Decreasing $A_N$ also may not always be an option. This is partly because decreasing $A_N$ reduces the overall porosity of the liner, which directly diminishes the acoustic admittance. Moreover, if the liner is cooled, the resonator necks also serve as coolant passages to cool the face sheet. Decreasing the size or quantity of the resonator necks/coolant passages could therefore compromise the durability of the liner. Accordingly, increasing $L_N$ may be the most viable option for tuning a resonator chamber to attenuate low frequency noise.

SUMMARY

One embodiment of the acoustic liner described herein includes a remote panel, a proximate panel transversely spaced from the remote panel and a resonator chamber residing between the panels. Perforations penetrate the proximate panel in registration with the resonator chamber. A neck with an inlet recessed from the proximate panel establishes communication between the chamber and a fluid stream flowing past the proximate panel. A bypass coolant passage guides coolant to the perforations without guiding it through the resonator chamber or the neck.

Another embodiment of the acoustic liner includes a remote panel, a perforated proximate panel transversely spaced from the remote panel and one or more partitions spanning across the space between the panels. At least one baffle cooperates with the partitions to define a resonator chamber and an associated neck for establishing communication between the resonator chamber and a fluid stream flowing past the proximate panel.

The foregoing and other features of the various embodiments of the acoustic liner will become more apparent from the following detailed description and the accompanying drawings.

DETAILED DESCRIPTION

Figure 1:
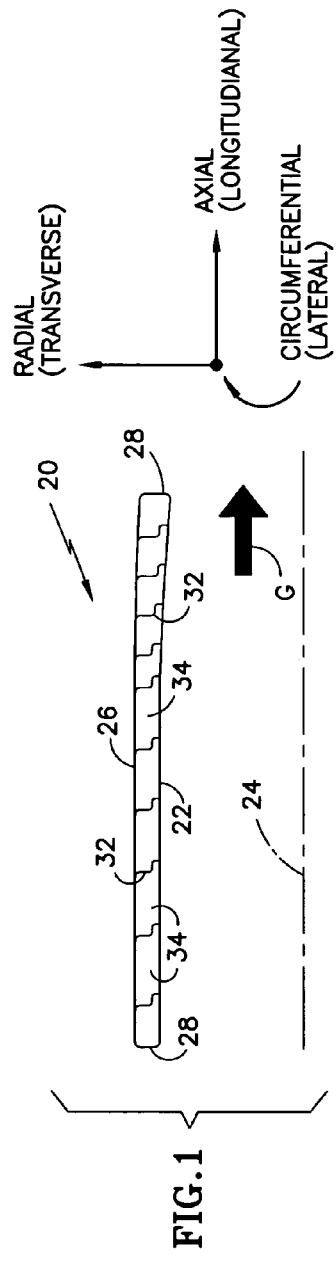
FIG. 1 is a cross sectional side elevation view of a conventional afterburner screech liner for a gas turbine engine.

FIG. 1 shows a conventional noise attenuating liner 20 used in an afterburner duct of an aircraft turbine engine. The liner is also known as a screech liner. The illustration also indicates a coordinate system with axial, radial and circumferential (perpendicular to the plane of the illustration) directional components since such a system is a natural choice when describing turbine engines. However in other applications, including those not involving ducts, a more general coordinate system employing longitudinal, transverse and lateral directional components may be more appropriate. As seen in the illustrations, the longitudinal direction corresponds to the axial direction, the transverse direction-corresponds to the radial direction and the lateral direction corresponds to the circumferential direction.

The acoustic liner 20 includes a proximate panel 22 circumscribing a duct centerline 24 and a remote panel 26 radially spaced from the proximate panel and also circumscribing the centerline to define an inter-panel annulus. The proximate and remote panels are also referred to as a face sheet and a back sheet respectively. Endwalls 28 join the panels together at their axial extremities. Stiffeners 32, which extend circumferentially 360 degrees, are attached to the panels and span radially across the inter-panel space. The stiffeners act as partitions that cooperate with the panels to define inter-panel compartments 34. During engine operation a stream of hot gases G flows axially through the duct. The proximate panel is relatively hot due to its proximity to the hot gas stream. The remote panel is relatively cold due to its remoteness from the hot gas stream.

Figure 2:
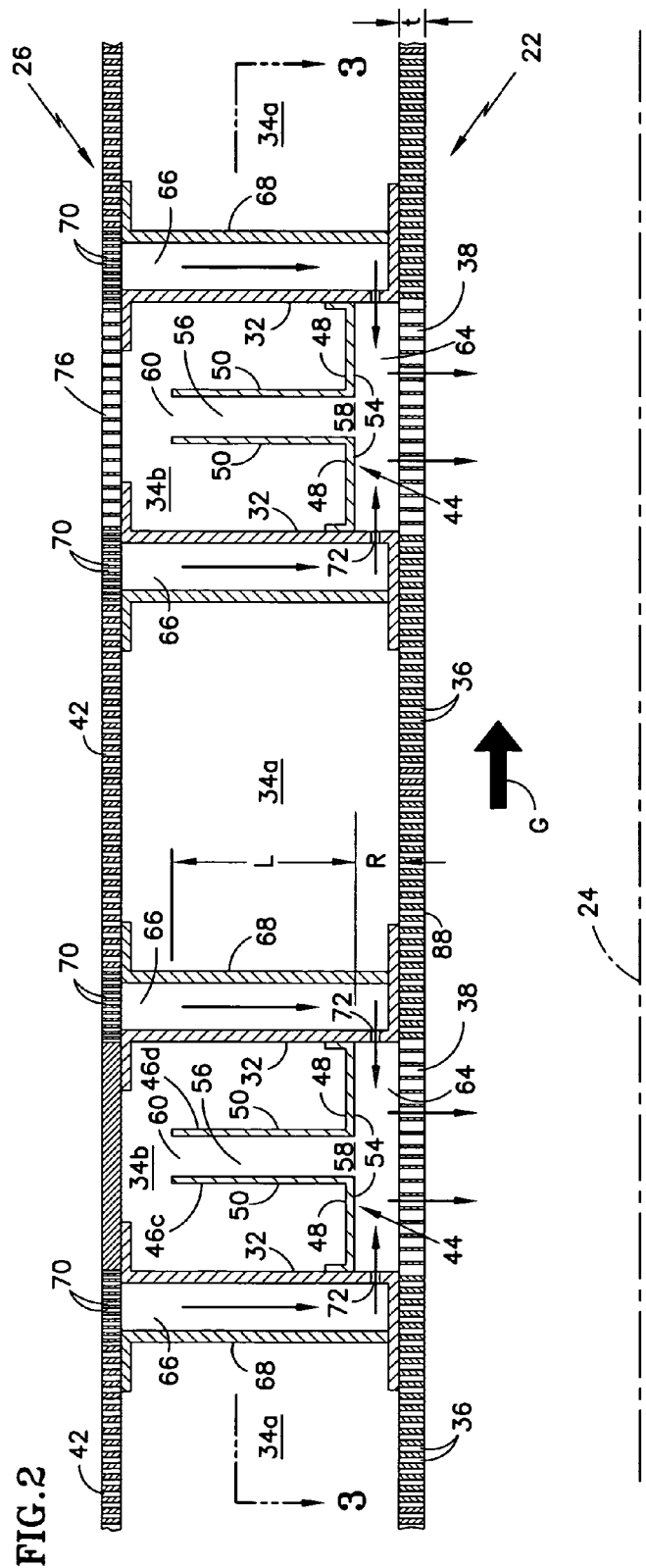
FIG. 2 is a schematic view similar to FIG. 1 taken in the direction 2-2 of FIG. 3 and showing a liner with an innovative resonator chamber and an innovative bypass cooling system.
Figure 3:
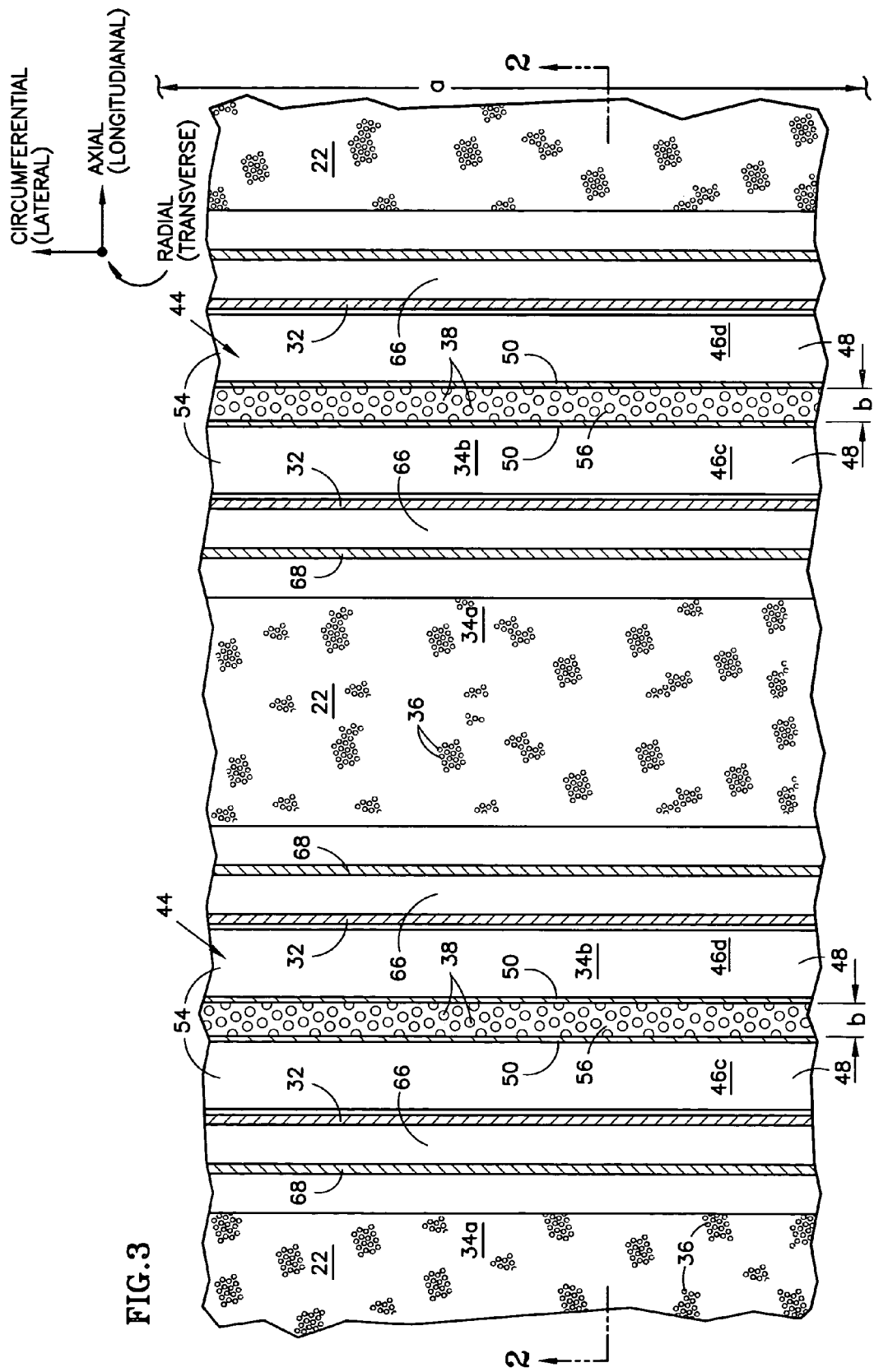
FIG. 3 is a developed view in the direction 3-3 of FIG. 2.

FIGS. 2 and 3 are more schematic views depicting the partitions 32 as straight, radially extending elements and showing additional details of an innovative liner. The proximate panel 22 includes perforations 36 in registration with selected compartments to define resonator chambers such as representative chamber 34a. Note that FIG. 3 and succeeding developed views show only clusters of perforations 36 even though the proximate panel is perforated throughout. The perforations 36 serve as necks for establishing communication between the chamber 34a and the gaseous fluid stream G. The length of each neck equals the radial thickness t of the proximate panel. Since the proximate panel is usually relatively thin sheet metal or other sheet stock, the neck length is small. As a result, each chamber 34a is effective at attenuating relatively high frequency noise. The perforations 36 form a perforation array of relatively low porosity in comparison to the array of perforations 38 discussed below. Coolant admission holes 42 may penetrate the remote panel to supply coolant to the chamber 34a. The perforations 36 would then also serve as coolant discharge passages. However as noted above, the flow of coolant causes impaired acoustic admittance at the coolant flow rates required for satisfactory cooling.

Compartments 34b include a baffle 44. The baffle of FIGS. 2 and 3 is formed of two opposing sheet metal pieces 46c, 46d. Each piece 46c, 46d extends circumferentially 360 degrees, or may be made of individual segments secured together to extend 360 degrees. Each piece 46c, 46d has an axially extending leg 48 in contact with one of the partitions 32 and a radially extending leg 50. The axially extending legs define a baffle base 54 while the radially extending legs define a resonator neck 56 having a length L. The neck has an inlet 58 and an outlet 60. The inlet is radially recessed by a recess distance R from the proximate panel so that the baffle base 54, the proximate panel 22, and two axially neighboring partitions 32 define a coolant plenum 64. The baffle also cooperates with the neighboring partitions 32 to define a resonator chamber 34b. Because the baffle extends 360 degrees, the neck 56 is a circumferentially continuous slot. The neck has a circumferential dimension a and an axial dimension b both measured at the radial location of the inlet 58. In the liner of FIGS. 2 and 3, the circumferential dimension exceeds the axial dimension. The proximate panel 22 also includes the perforations 38 in registration with the compartments 34b. Perforations 38 form a perforation array of high enough porosity that the neck 56, not the perforations 38, influence the noise frequency that the chamber responds to. Because the length L of neck 56 significantly exceeds the length t of necks 36, chamber 34b responds to lower frequencies while chamber 34a responds to higher frequencies.

A bypass cooling system is provided to guide coolant to the perforations 38 without requiring that the coolant first pass through the resonator chamber 34b or neck 56. The bypass cooling system includes radially extending bypass coolant passages 66 alongside the chamber 34b and the coolant plenum 64. Each passage 66 is defined by a passage wall 68 cooperating with a partition 32. The passage may be circumferentially continuous as shown in FIGS. 2 and 3, or may be circumferentially segmented into multiple sub-passages. A coolant intake comprising one or more openings 70 in the remote panel admits coolant to the passage. A coolant outlet 72 adjacent to the coolant plenum discharges the coolant into the plenum. The coolant then flows through the perforations 38 to cool the proximate panel. Because the coolant bypasses the chamber 34b and neck 56, and because the high porosity array of perforations 38 have little or no effect on the acoustic admittance of chamber 34b, the flow of coolant does not adversely affect the noise attenuating properties of the chamber 34b. If necessary, optional coolant admission holes 76 may penetrate the remote panel to supply additional coolant to chamber 34b. Although the flow of this additional coolant through the resonator neck 56 would degrade the acoustic admittance, the effect will be less severe than if all the coolant flowed through the chamber and neck.

Although the foregoing discussion describes the bypass cooling system in conjunction with an architecture for a low frequency resonator chamber, the two concepts may be used independently.

FIGS. 4-8 show various distributions of resonator chambers, which will now be described in more detail. For simplicity, the figures show, and the discussion describes, resonator chambers without the bypass cooling system. However it is clear that the chamber distributions described below can be used with or without the bypass cooling system.

Figure 4:
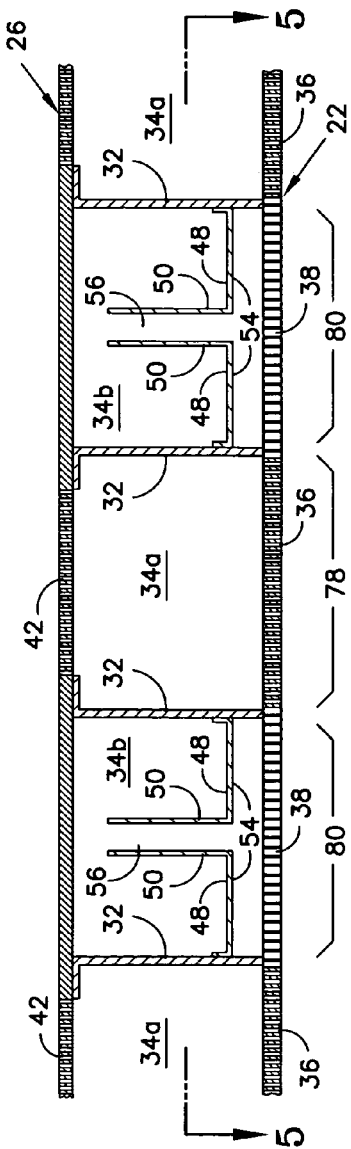
FIG. 4 is a view similar to FIG. 2 and taken along the section line 4-4 of FIG. 5, 6, 7 or 8.
Figure 5:
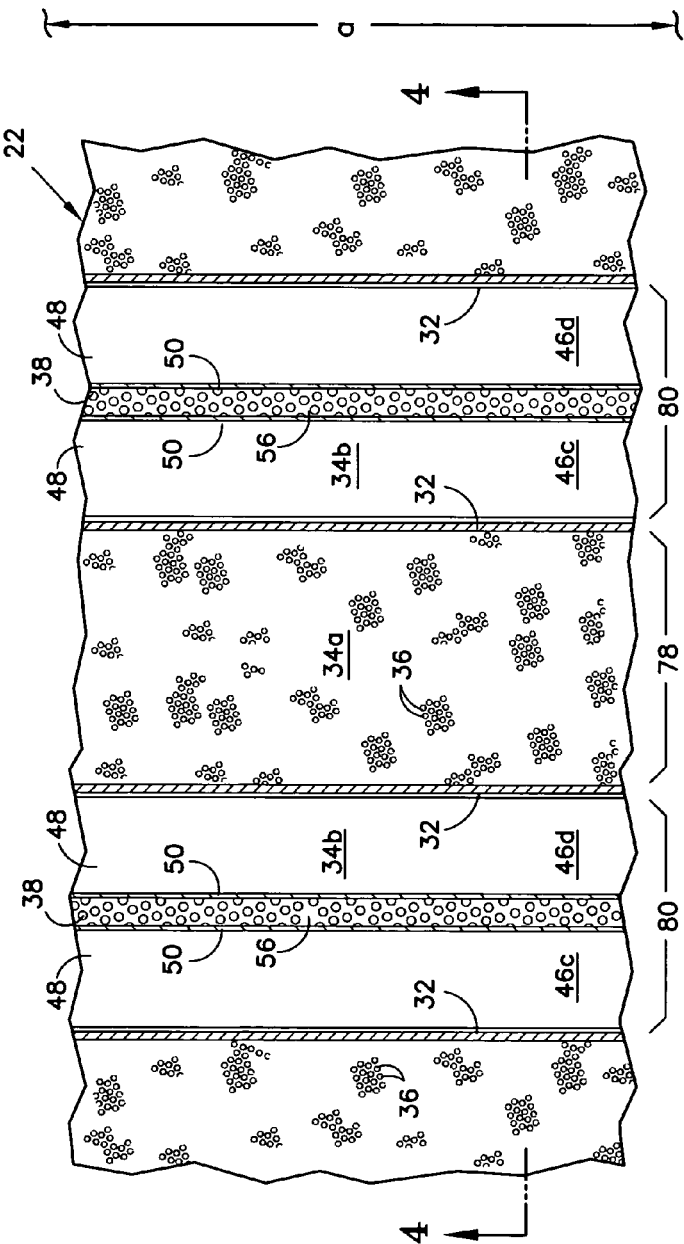
FIG. 5 is a developed view in the direction 5-5 of FIG. 4 showing a liner with axially distinct, circumferentially continuous resonator bands.

As seen in FIGS. 4 and 5 the resonator chambers 34a form circumferentially extending resonator bands 78 responsive to higher frequencies. The resonator chambers 34b form circumferentially extending resonator bands 80 responsive to lower frequencies. The lower frequency resonator bands 80 are axially offset from the higher frequency bands 78. The presence of the higher and lower frequency bands causes the liner to attenuate a broader spectrum of noise frequencies.

Figure 6:
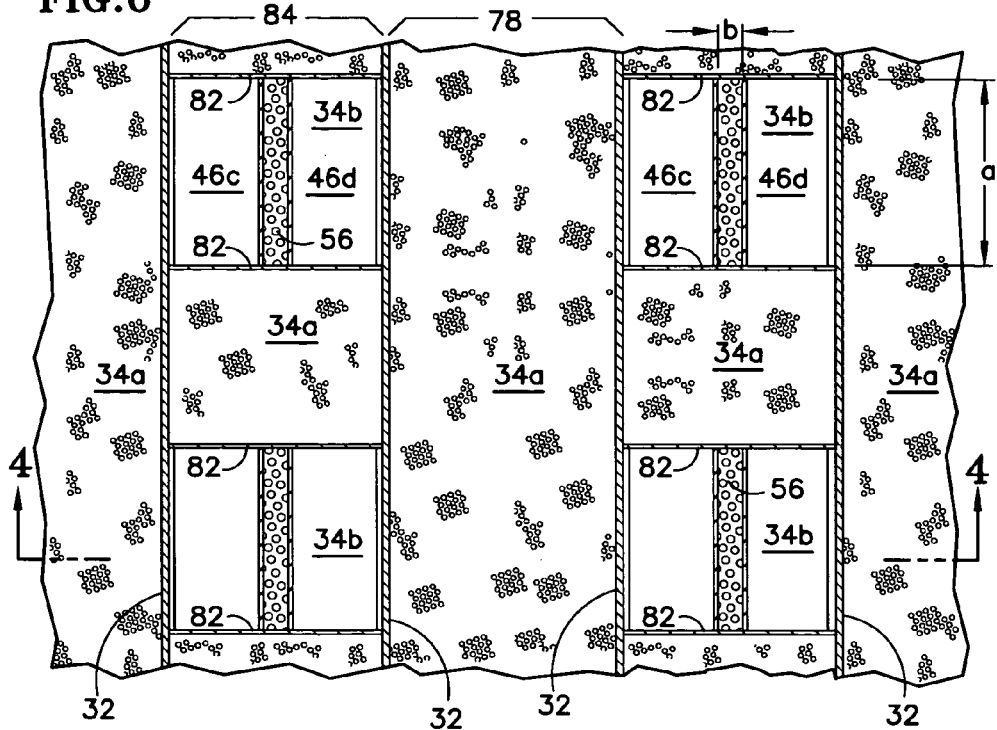
FIG. 6 is a view similar to FIG. 5 but showing two classes of resonator chambers in some of the resonator bands with similar classes of chambers being circumferentially aligned in successive multi-class bands.

FIG. 6 shows an acoustic liner similar to that of FIG. 5 but including auxiliary partitions 82 extending axially between neighboring partitions 32 and radially between the proximate and remote panels 22, 26. Baffle pieces 46c, 46d extend circumferentially between selected neighboring pairs of auxiliary partitions. The baffles cooperate with the auxiliary partitions 82 and primary partitions 32 to define a lower frequency resonator chamber 34b and its associated neck 56. The neck has a circumferential dimension a and an axial dimension b measured at the same radius as the circumferential dimension. The circumferential dimension exceeds the axial dimension. In FIG. 6, axially forward and aft resonator bands 84 each include a first class of circumferentially distributed resonator chambers 34b defined in part by the baffles and a second class of circumferentially distributed chambers 34a without baffles. The chambers 34b are circumferentially interposed between chambers 34a to form a resonator band responsive to multiple frequencies. Resonator bands 78 without baffles are axially interposed between bands 84. The classes of chambers 34a, 34b in successive multi-frequency bands 84 are circumferentially aligned with each other.

Figure 7:
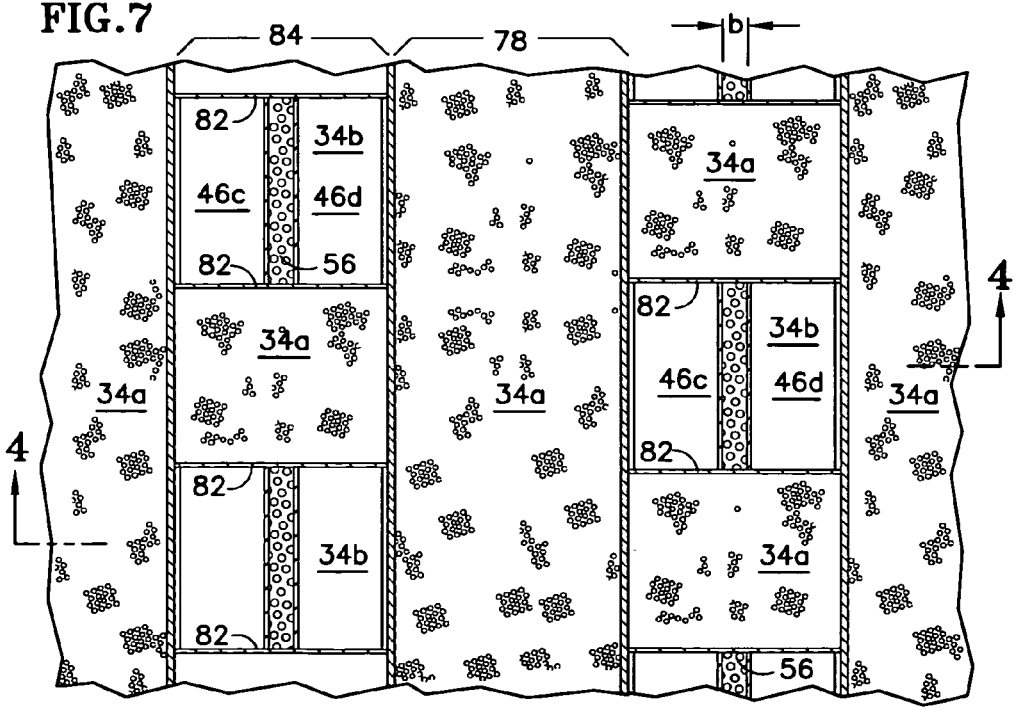
FIG. 7 is a view similar to FIG. 6 but showing similar classes of chambers being circumferentially misaligned in successive multi-class bands.

FIG. 7 shows a liner similar to that of FIG. 6 except that the chambers 34a and 34b in successive multi-frequency bands are circumferentially nonaligned with each other.

Figure 8:
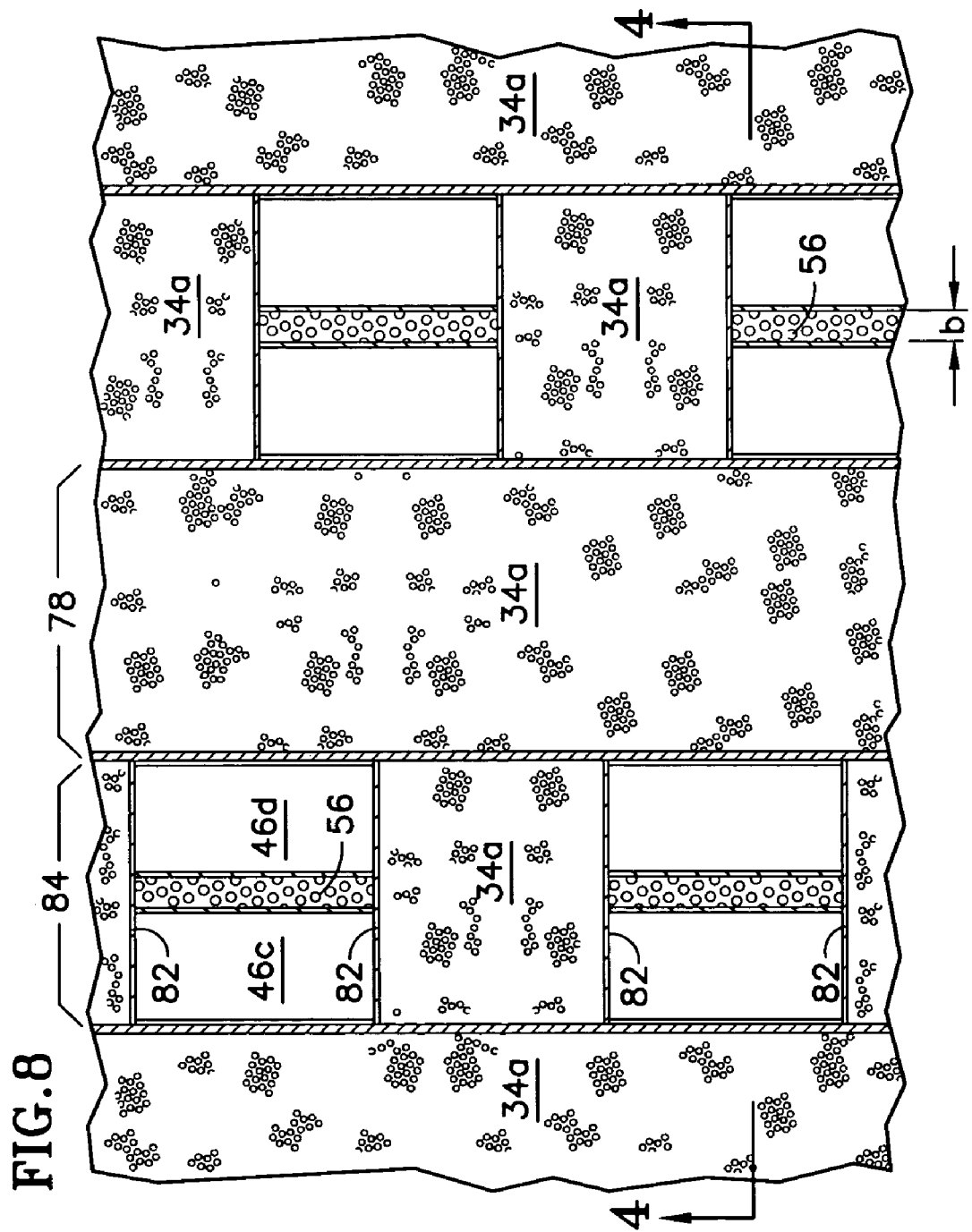
FIG. 8 is a view similar to FIG. 6 but showing similar classes of chambers being circumferentially offset in successive multi-class bands.

FIG. 8 shows a liner similar to that of FIG. 6 except that the chambers 34a are circumferentially offset with the chambers 34b in the succeeding multi-frequency band, but not completely misaligned as in FIG. 7.

Figure 9:
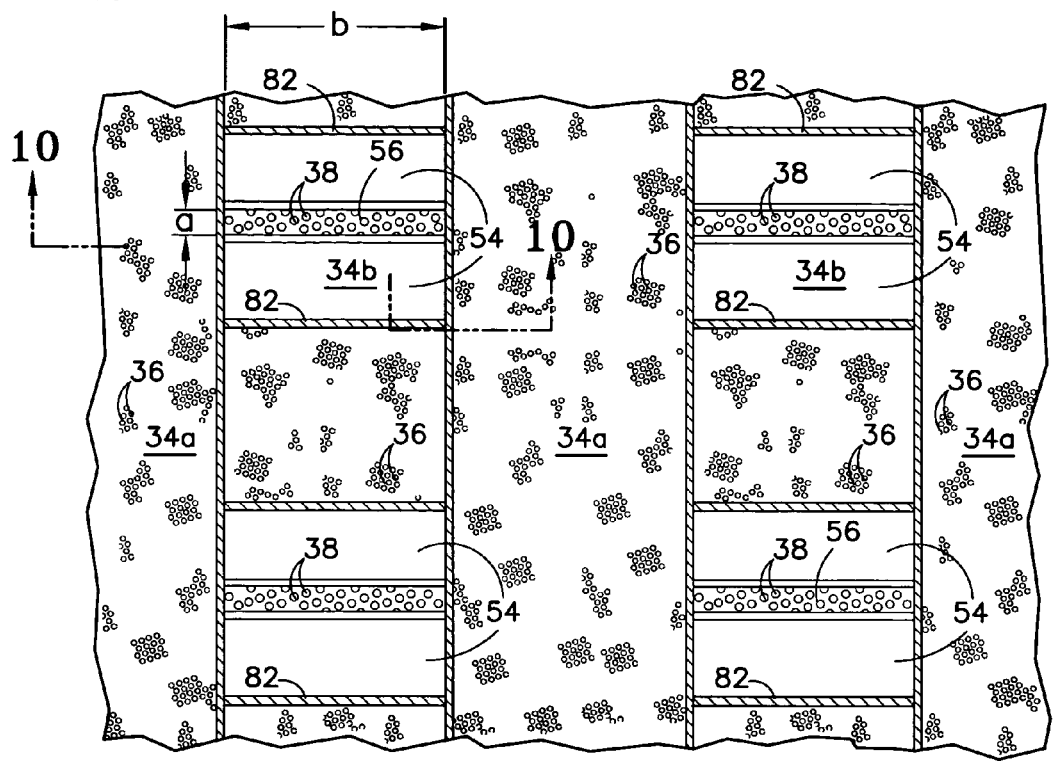
FIG. 9 is a view similar to FIG. 6 and taken in the direction 9-9 of FIG. 10 showing an alternate orientation of a resonator neck.
Figure 10:
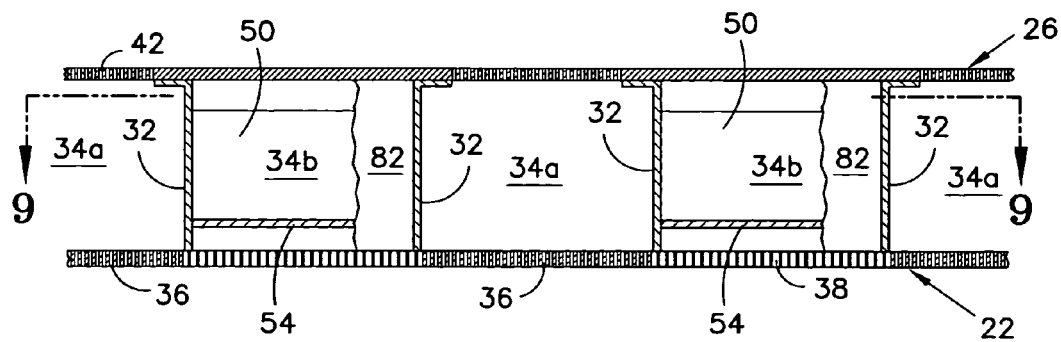
FIG. 10 is a view in the direction 10-10 of FIG. 9.

FIGS. 9 and 10 show a liner in which the baffles are arranged so that neck circumferential dimension a is smaller than neck an axial dimension b.

Figure 11:
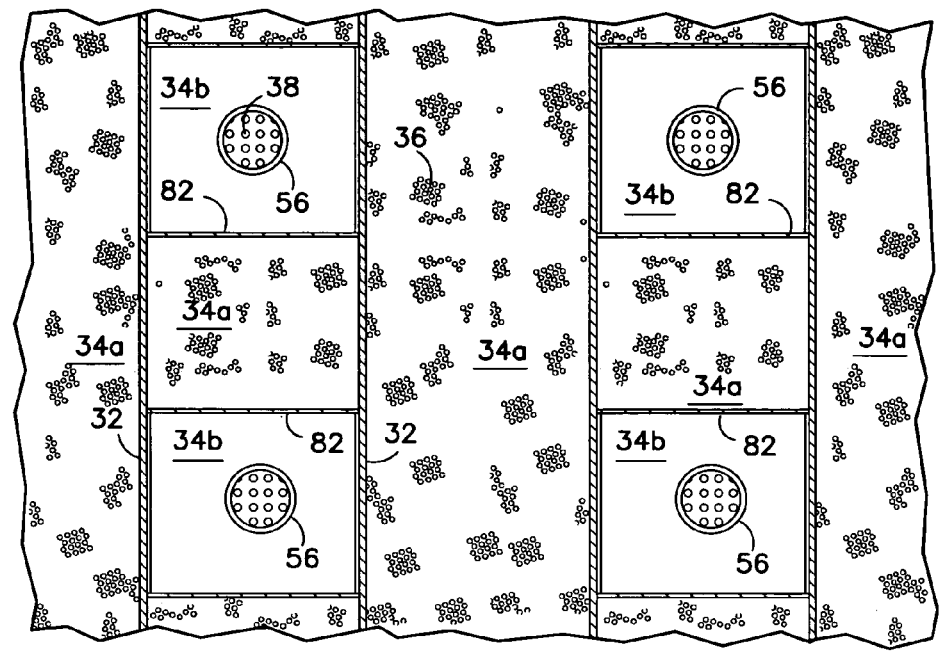
FIG. 11 is a view similar to FIG. 6 but showing an isolated resonator neck.
Figure 12:
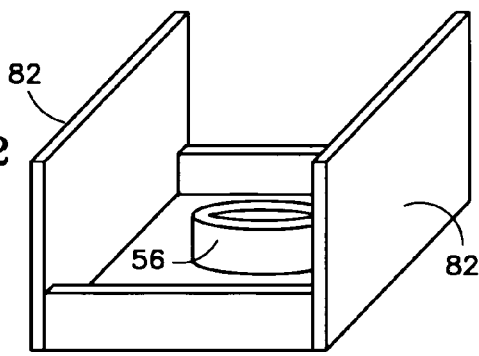
FIG. 12 is a perspective view of a resonator chamber of FIG. 11.

FIGS. 11 and 12 show a liner similar to that of FIG. 6 except that the discrete necks 56 are isolated rather than extending to the auxiliary partitions 82 or to the principal partitions 32. The illustrated neck is cylindrical, but may have some other curved or faceted shape when seen in plan view as in FIG. 11.

FIGS. 2-11 depict liners in which resonator bands with baffles are axially separated by resonator bands without baffles. Such an arrangement may be especially practical when used in conjunction with a bypass cooling system. In principle, however, the bands without baffles need not be present. In other words, the entire liner can be constructed with bands like, for example, the bands 80 indicated in FIGS. 4 and 5 or, for example, the bands 84 indicated in FIGS. 6-8.

FIGS. 6-11 depict liners in which selected resonator bands 84 include a class of chambers with baffles and a class without baffles. In principle, the chambers without baffles need not be present.

Figure 13:
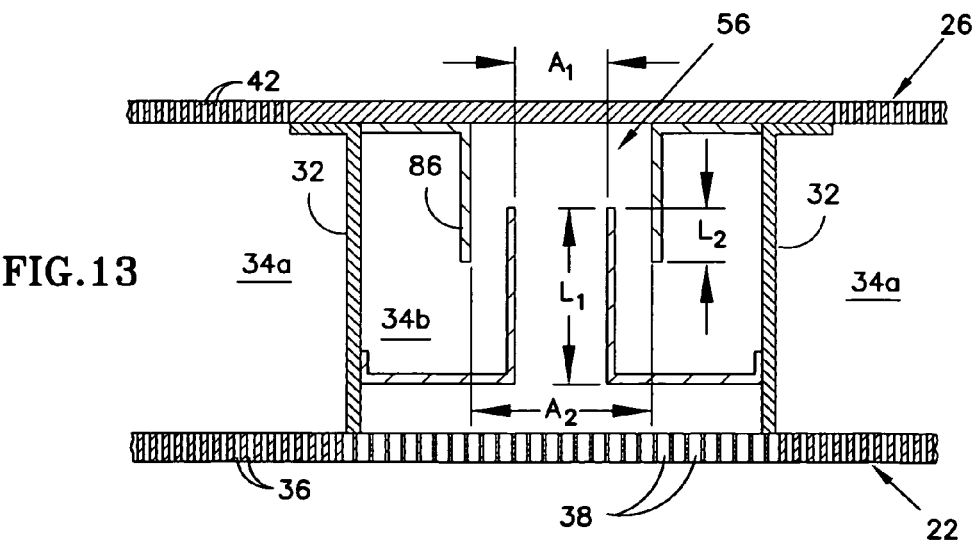
FIG. 13 is a view similar to FIG. 4 showing a folded resonator neck.

FIG. 13 shows a resonator chamber whose elongated neck 56 is a folded neck defined in part by a skirt 86 that extends radially inwardly from the remote panel 26. The effective length of the folded neck is the sum of the individual lengths $L_1$ and $L_2$. Typically the area $A_1$ equals the annular area $A_2$. The folded configuration is applicable to the circumferentially continuous neck (FIG. 3), the localized neck (e.g. FIGS. 6 and 9) and the isolated neck (FIG. 11).

Although the baffled chambers and the bypass cooling system can be used independently, certain advantages may be obtained by using both concepts in a single liner. Referring back to FIGS. 2 and 3, the chambers 34a can be tuned to higher frequencies, and the tuning can be spatially varied throughout the liner if desired. Similarly, the chambers 34b can be tuned to lower frequencies, and the tuning of these chambers can also be spatially varied if desired. However the chambers 34b can be tuned to particularly low frequencies due to the extended neck 56. The region of the face sheet in the vicinity of chambers 34b can be cooled as described with the bypass cooling system without compromising the acoustic admittance of chambers 34b. This cooling may be less effective than the cooling in the vicinity of chambers 34a because of the high porosity of the array of perforations 38 in comparison to the lower porosity of the array of perforations 36. However the less effective cooling may be justifiable in return for the acoustic admittance. Moreover, the coolant discharging through perforations 36 will form a coolant film on the surface 88 of the proximate panel. This film can extend across the region of the panel penetrated by perforations 38 and help compensate for the reduced cooling effectiveness in that region. Thus, the designer can trade acoustic performance for cooling effectiveness and vice versa. These considerations will help determine the pattern of chambers (for example the different patterns seen in FIGS. 6-8).

Although this invention has been shown and described with reference to a specific embodiment thereof, it will be understood by those skilled in the art that various changes in form and detail may be made without departing from the invention as set forth in the accompanying claims. For example, although the liner has been described in the context of a turbine engine afterburner duct, it can be applied to other types of ducts or to surfaces other than duct walls.

We claim:

1. An acoustic liner for attenuating noise in a substantially longitudinally flowing fluid stream, comprising:
   a remote panel;
   a perforated proximate panel transversely spaced from the remote panel;
   one or more partitions spanning across a space between the remote and perforated proximate panels and contacting the remote and perforated proximate panels to define at least one inter-panel compartment; and
   at least one baffle cooperating with the one or more partitions to define at least one resonator chamber and an associated neck for establishing communication between the at least one resonator chamber and a fluid stream.

2. The liner of claim 1 wherein the remote panel is a relatively cold panel and the perforated proximate panel is a relatively hot panel.

3. The liner of claim 1 wherein the liner circumscribes an axis, a longitudinal direction is axial, a transverse direction is radial, and a lateral direction mutually perpendicular to the longitudinal and transverse directions is circumferential.

4. The liner of claim 1 wherein the neck has longitudinal and lateral dimensions, and the lateral dimension exceeds the longitudinal dimension.

5. The liner of claim 1 comprising multiple resonator chambers all tuned to the same frequency.

6. The liner of claim 1 wherein perforations penetrate the perforated proximate panel in registration with the at least one resonator chambers and the liner comprises a bypass cooling system for conveying bypass coolant to the perforations without guiding the bypass coolant through the at least one resonator chambers.

7. The liner of claim 6 wherein the at least one baffles includes a base transversely recessed from the perforated proximate panel to define a coolant plenum, and wherein a bypass coolant passage is defined at lest in part by a passage wall and a cooperating partition.

8. An acoustic liner for attenuating noise in a substantially longitudinally flowing fluid stream, comprising:
   a remote panel;
   a perforated proximate panel transversely spaced from the remote panel;
   one or more partitions spanning across a space between the remote and perforated proximate panels and cooperating with the remote and perforated proximate panels to define at least one inter-panel compartment:
   at least one baffle cooperating with the one or more partitions to define at least one resonator chamber and an associated neck for establishing communication between the at least one resonator chamber and a fluid stream; and wherein perforations penetrate the perforated proximate panel in registration with the at least one resonator chamber and the liner comprises a bypass cooling system for conveying bypass coolant to the perforations without guiding the bypass coolant through the at least one resonator chamber; and wherein the at least one baffle includes a base transversely recessed from the perforated proximate panel to define a coolant plenum, and wherein a bypass coolant passage is defined at least in part by a passage wall and a cooperating partition; and wherein the bypass coolant passage includes a coolant intake comprising an opening in the remote panel and also includes a coolant outlet for discharging coolant into the coolant plenum.

9. The liner of claim 1 including a skirt for defining a folded neck.

10. The liner of claim 9 wherein the skirt extends from the remote panel.

11. The liner of claim 1 wherein the at least one resonator chamber is a lower frequency resonator chamber and the liner also includes at least one higher frequency resonator chamber.

12. The liner of claim 11 wherein the perforated proximate panel includes regions of higher porosity in registration with lower frequency chambers and regions of lower porosity in registration with higher frequency chambers, and the liner also includes a bypass cooling system for conveying bypass coolant to higher porosity regions without admitting the bypass coolant to the resonator chambers.

13. The liner of claim 11 comprising multiple lower frequency resonator chambers all tuned to a common lower frequency and multiple higher frequency resonator chambers all tuned to a common higher frequency.

14. The liner of claim 11 wherein the remote panel includes coolant admission holes for admitting coolant into higher frequency resonator chambers.

15. The liner of claim 1 wherein the remote panel includes auxiliary coolant admission holes for admitting auxiliary coolant into the resonator chambers.

16. The liner of claim 1 wherein the neck is laterally continuous.

17. The liner of claim 1 wherein the neck is isolated.

18. The liner of claim 17 wherein the neck is cylindrical.

19. The liner of claim 12 including a resonator band responsive to a higher range of frequencies and a resonator band responsive to a lower range of frequencies axially offset from the higher range of frequencies.

20. The liner of claim 1 comprising a longitudinally forward band of resonator chambers and a longitudinally aft band of resonator chambers, each band including laterally distributed resonator chambers of at least two classes.

21. The liner of claim 20 wherein the resonator chambers are laterally distributed so that resonator chambers of a given class in the forward band are laterally aligned with resonator chambers of the same class in the aft band.

22. The liner of claim 20 wherein the resonator chambers are laterally distributed so that resonator chambers of a given class in the forward band are laterally nonaligned with resonator chambers of the same class in the aft band.

23. The liner of claim 22 wherein the resonator chambers are laterally distributed so that resonator chambers of a given class in the forward band are laterally offset relative to resonator chambers of the same class in the aft band.

24. The liner of claim 1 wherein the perforated proximate panel includes at least a first set of perforations in communication with higher frequency resonance chambers and at least a second set of perforations in communication with lower frequency resonance chambers, the first and second sets of perforations having different porosities.

25. The liner of claim 24 including a plenum positioned directly between the at least one resonator chamber and the perforated proximate panel, such that the plenum is formed by an area defined between the one or more partitions, the at least one baffle, and the perforated proximate panel, and wherein the associated neck has an inlet at one end defined in a baffle base of the at least one baffle and an outlet at an opposite end positioned within the at least one resonator chamber.

26. The liner of claim 25 wherein the at least one baffle includes first and second pieces, each of the first and second pieces including an axially extending leg in contact with one partition to form the baffle base, and each of the first and second pieces including a radially extending leg that forms the associated neck, and wherein the inlet is formed within the baffle base such that the associated neck does not extend into the plenum.

* * * * *